United States Patent [19]

Zaiki

[11] Patent Number: 5,634,059

[45] Date of Patent: May 27, 1997

[54] DEVICE AND METHOD FOR PARALLELIZING COMPILATION OPTIMIZING DATA TRANSMISSION

[75] Inventor: Koji Zaiki, Kadoma, Japan

[73] Assignee: Matsushita Electric Industrial Co., Ltd., Osaka, Japan

[21] Appl. No.: 322,609

[22] Filed: Oct. 13, 1994

[30] Foreign Application Priority Data

Oct. 13, 1993 [JP] Japan .................. 5-255609

[51] Int. Cl.[6] .................. G06F 9/30; G06F 9/45
[52] U.S. Cl. .................. 395/706; 395/709; 395/705; 395/800
[58] Field of Search .................. 364/973, 280.4, 364/280.5, 931.41; 395/705, 706, 709, 800

[56] References Cited

U.S. PATENT DOCUMENTS

| | | | |
|---|---|---|---|
| 5,067,068 | 11/1991 | Iwasawa et al. | 395/650 |
| 5,088,034 | 2/1992 | Ihara et al. | 395/700 |
| 5,146,594 | 9/1992 | Iitsuka | 395/700 |
| 5,151,991 | 9/1992 | Iwasawa et al. | 395/700 |
| 5,230,053 | 7/1993 | Zaiki | 395/700 |
| 5,274,812 | 12/1993 | Inoue | 395/700 |
| 5,317,743 | 5/1994 | Imai et al. | 395/700 |
| 5,396,631 | 3/1995 | Hayashi et al. | 395/700 |
| 5,437,034 | 7/1995 | Tanaka et al. | 395/700 |

FOREIGN PATENT DOCUMENTS 4293150  10/1992  Japan .

OTHER PUBLICATIONS

"Advanced Compiler Optimizations for Supercomputers", by d. Padua et al., Communications of the ACM, Dec. 1986, vol. 29, No. 12.

Annaratone, M et al "Balancing Interprocessor Communication and Computation on Torus–Connected Multicomputers Running Compiler–Parallelized Code", Apr. 1992, IEEE Compt. Soc. Press, pp. 358–365.

Banerjee, D et al, "An Optimizing Compiler for FP*–A Data–Parallel Dialect of FP", Nov. 1991, IEEE Compt. Soc. Press, pp. 70–78.

*Primary Examiner*—Kevin A. Kriess
*Assistant Examiner*—Michael T. Richey
*Attorney, Agent, or Firm*—Price, Gess & Ubell

[57] ABSTRACT

The present invention relates to an optimizing compiler apparatus for converting a source program into an object program for use by a parallel computer, which optimizes the number of data transmissions between processing elements for a parallel computer made up of a plurality of processing elements, composed of a loop retrieval unit for retrieving the loop processes from a program, a data transmission calculation unit for calculating the data transmission count generated when each of the loop processes is parallelized, a parallelization determination unit for determining the loop to be parallelized as the loop, out of all the loops in a multiple loop, with the lowest data transmission count and a code generation unit for generating parallelized object code for the determined loop. The data transmission calculation unit is made up of a right side variable retrieval unit for retrieving the variables on the right side of an equation in the loop retrieved by the loop retrieval unit, a variable information storage unit for storing information relating to array variables which should be distributed among every processing element for the part of the program which comes before the loop retrieved by the loop retrieval unit and a calculation unit for calculating the data transmission count based on the variable information for the retrieved right side variable.

20 Claims, 11 Drawing Sheets

PROGRAM ASSIGNED TO PE 1
```
    do 10  j=1,8
       a(1,j)=b(1,j)+c(1,j)
10  continue
```

PROGRAM ASSIGNED TO PE 2
```
    do 10  j=1,8
       a(2,j)=b(2,j)+c(2,j)
10  continue
```

. . .

PROGRAM ASSIGNED TO PE 8
```
    do 10  j=1,8
       a(8,j)=b(8,j)+c(8,j)
10  continue
```

FIGURE 3B

PROGRAM ASSIGNED TO PE 1
```
    do 20  i=1,8
       d(i,1)=a(i,1)+e(i,1)
20  continue
```

PROGRAM ASSIGNED TO PE 2
```
    do 20  i=1,8
       d(i,2)=a(i,2)+e(i,2)
20  continue
```

. . .

PROGRAM ASSIGNED TO PE 8
```
    do 20  i=1,8
       d(i,8)=a(i,8)+e(i,8)
20  continue
```

FIGURE 4

| PE1 | PE2 | PE3 | PE4 | PE5 | PE6 | PE7 | PE8 |
|---|---|---|---|---|---|---|---|
| a(1,1) | a(2,1) | a(3,1) | a(4,1) | a(5,1) | a(6,1) | a(7,1) | a(8,1) |
| a(1,2) | a(2,2) | a(3,2) | a(4,2) | a(5,2) | a(6,2) | a(7,2) | a(8,2) |
| a(1,3) | a(2,3) | a(3,3) | a(4,3) | a(5,3) | a(6,3) | a(7,3) | a(8,3) |
| a(1,4) | a(2,4) | a(3,4) | a(4,4) | a(5,4) | a(6,4) | a(7,4) | a(8,4) |
| a(1,5) | a(2,5) | a(3,5) | a(4,5) | a(5,5) | a(6,5) | a(7,5) | a(8,5) |
| a(1,6) | a(2,6) | a(3,6) | a(4,6) | a(5,6) | a(6,6) | a(7,6) | a(8,6) |
| a(1,7) | a(2,7) | a(3,7) | a(4,7) | a(5,7) | a(6,7) | a(7,7) | a(8,7) |
| a(1,8) | a(2,8) | a(3,8) | a(4,8) | a(5,8) | a(6,8) | a(7,8) | a(8,8) |

FIGURE 5

| PE1 | PE2 | PE3 | PE4 | PE5 | PE6 | PE7 | PE8 |
|---|---|---|---|---|---|---|---|
| a(1,1) | a(1,2) | a(1,3) | a(1,4) | a(1,5) | a(1,6) | a(1,7) | a(1,8) |
| a(2,1) | a(2,2) | a(2,3) | a(2,4) | a(2,5) | a(2,6) | a(2,7) | a(2,8) |
| a(3,1) | a(3,2) | a(3,3) | a(3,4) | a(3,5) | a(3,6) | a(3,7) | a(3,8) |
| a(4,1) | a(4,2) | a(4,3) | a(4,4) | a(4,5) | a(4,6) | a(4,7) | a(4,8) |
| a(5,1) | a(5,2) | a(5,3) | a(5,4) | a(5,5) | a(5,6) | a(5,7) | a(5,8) |
| a(6,1) | a(6,2) | a(6,3) | a(6,4) | a(6,5) | a(6,6) | a(6,7) | a(6,8) |
| a(7,1) | a(7,2) | a(7,3) | a(7,4) | a(7,5) | a(7,6) | a(7,7) | a(7,8) |
| a(8,1) | a(8,2) | a(8,3) | a(8,4) | a(8,5) | a(8,6) | a(8,7) | a(8,8) |

FIGURE 6

DATA PROCESSED BY EVERY PE FOR THE EXECUTION OF FIGURE 8A.

DATA NECESSARY FOR PE1 FOR THE EXECUTION OF FIGURE 8B.

| | |
|---|---|
| DATA CALCULATED BY PE 1 | a (1, 1) |
| DATA CALCULATED BY PE 2 | a (2, 1) |
| DATA CALCULATED BY PE 3 | a (3, 1) |
| DATA CALCULATED BY PE 4 | a (4, 1) |
| DATA CALCULATED BY PE 5 | a (5, 1) |
| DATA CALCULATED BY PE 6 | a (6, 1) |
| DATA CALCULATED BY PE 7 | a (7, 1) |
| DATA CALCULATED BY PE 8 | a (8, 1) | a (1, 1)
a (2, 1)
a (3, 1)
a (4, 1)
a (5, 1)
a (6, 1)
a (7, 1)
a (8, 1)

LEFT SIDE VARIABLE TABLE

| VARIABLE NAME | DIMENSIONS |
|---|---|
| a | 8, 8 |
| e | 8, 8 |
|  |  |

FIGURE 8B

RIGHT SIDE VARIABLE TABLE

| VARIABLE NAME | DIMENSIONS |
|---|---|
| b | *, 8 |
| c | *, 8 |
|  |  |

FIGURE 8C

LEFT SIDE VARIABLE STORAGE UNIT 208

| VARIABLE NAME | DIMENSIONS |
|---|---|
| b | *, 8 |
| c | *, 8 |
|  |  |

LEFT SIDE VARIABLE TABLE

| VARIABLE NAME | DIMENSIONS |
|---|---|
| d | 8, 8 |
|  |  |
|  |  |

FIGURE 11B

RIGHT SIDE VARIABLE TABLE

| VARIABLE NAME | DIMENSIONS |
|---|---|
| a | *, 8 |
| e | *, 8 |
|  |  |

FIGURE 11C

LEFT SIDE VARIABLE STORAGE UNIT 208

| VARIABLE NAME | DIMENSIONS |
|---|---|
| a | *, 8 |
|  |  |
|  |  |

DEVICE AND METHOD FOR PARALLELIZING COMPILATION OPTIMIZING DATA TRANSMISSION

BACKGROUND OF THE INVENTION

1. Field of the Invention

The present invention relates to a compiler which converts a source program into a program for parallel computer use, and in particular to a parallel compiler device and compilation method for optimizing data transmission between the processing elements of a parallel computer.

2. Description of the Related Art

Figure 1:
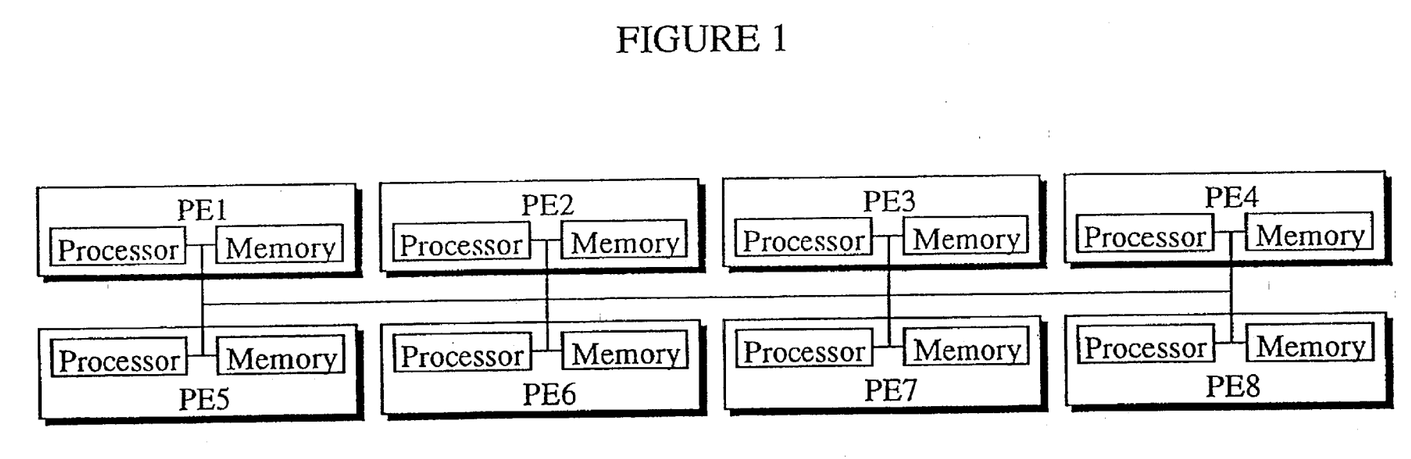
FIG. 1 is a block diagram showing an example construction of a parallel computer.

In recent years, the development of parallel computer systems which execute programs in parallel has been advancing. Parallel computers have a plurality of processing elements (PE) which execute a program, and achieve a parallel process by means of the various PE executing the program they have been assigned. FIG. 1 is a block diagram which shows an example construction of a parallel computer. The parallel computer in this diagram is comprised of processing elements PE1 through PE8, with each of these PE having a processor and a memory. Each memory stores the program to be executed by each processor. This program must be compiled so that each it can be processed in parallel by every PE.

Normally, source programs written in high-level languages such as FORTRAN are written on the premise of a serial process. In order to have these source programs executed by a parallel computer, it is necessary to equip the compiler which generates the object program from the source program with a function for generating an object program for parallel execution use.

The following is a description of a compiler which generates an object program for parallel execution use from a source program constructed according to the prior art. Such a compiler uses a method for having parallel execution, by extracting the parallelism from the repetitive processes contained in the source program, such as do loops, and allocating the iterations of the loops to each PE. Here, the extraction of the parallelism is executed for every multiple loop separately. The above technique is described in [David A. Pauda et al.:Advanced compiler optimizations for supercomputers, Communications of the ACM, pp1184–1201 (1986)]. In the following explanation, groups of instructions in the program which are usually executed repetitively will be called loops (or loop processes), while the process executed by one cycle of one of these loops will be referred to as an iteration.

Figure 2:
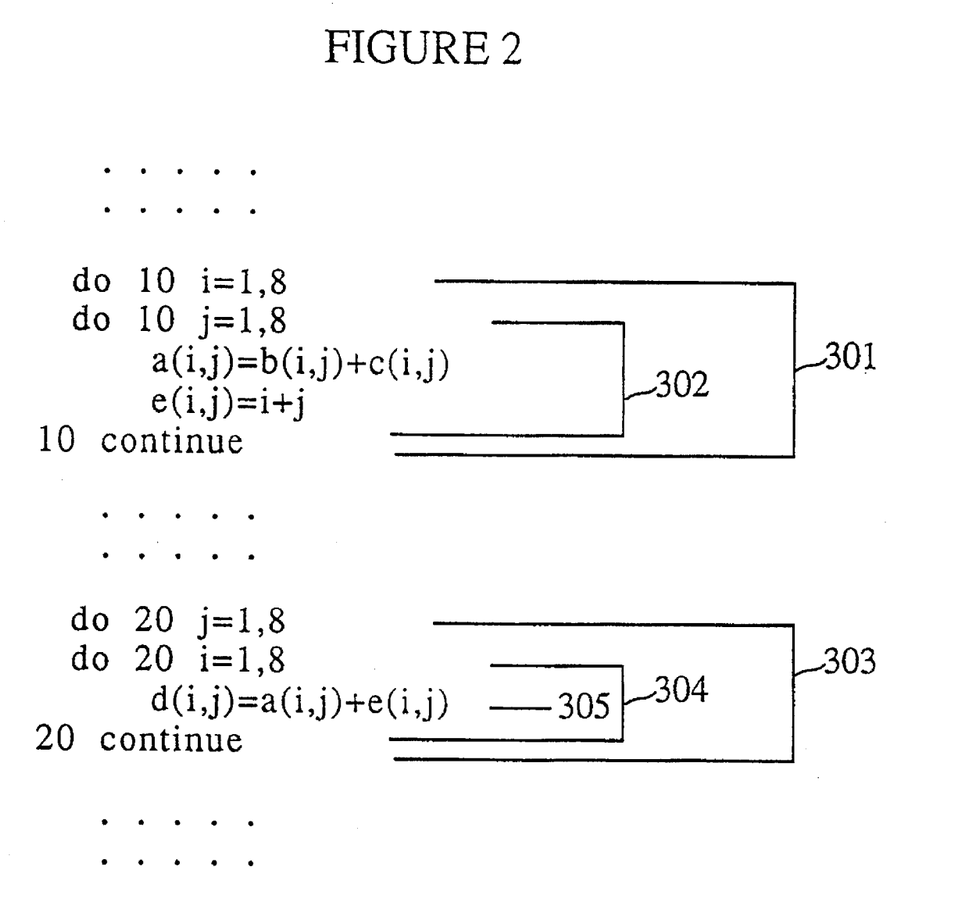
FIG. 2 is an example of a source program written in FORTRAN.
Figure 3A:
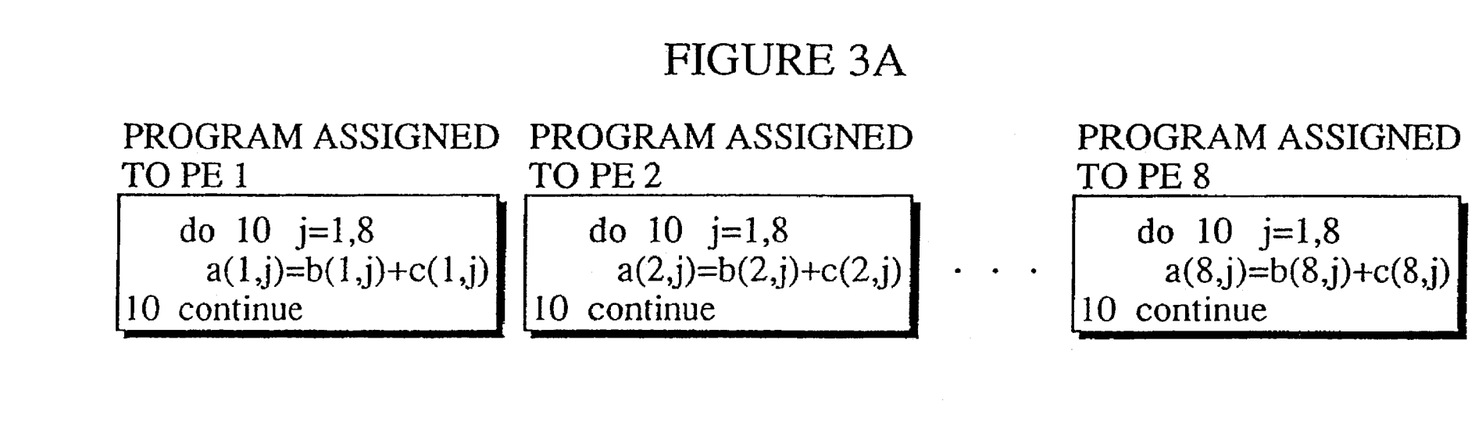
FIG. 3A, 3B show the respective programs generated when the program shown in FIG. 2 is parallelized.
Figure 3B:
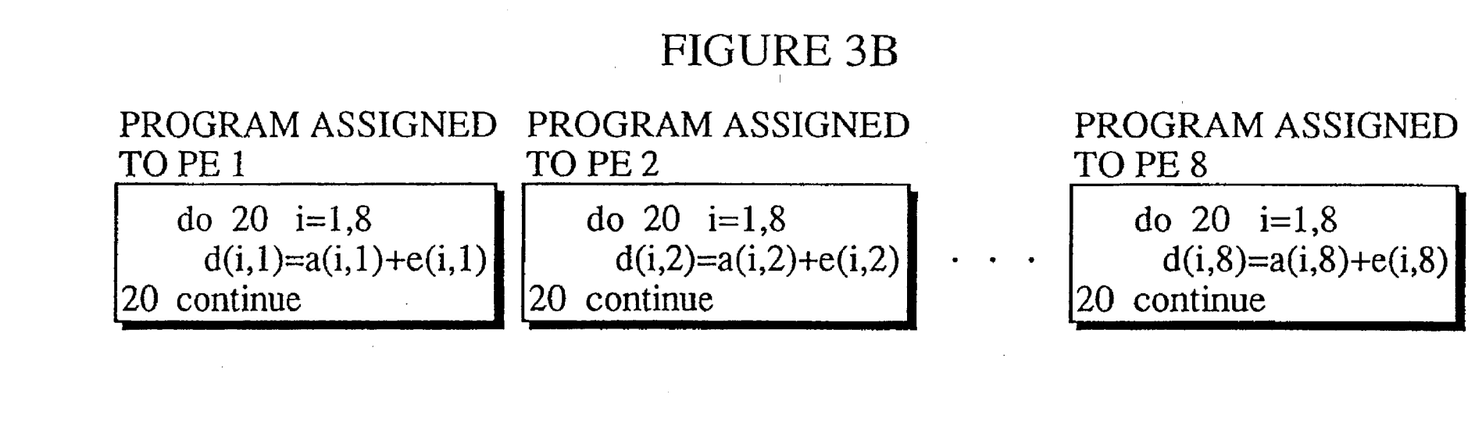

In FIG. 2 an example of a source program written in FORTRAN is given. In this example program, there is a first multiple loop consisting of the loops 301, 302 and a second multiple loop consisting of the loops 303, 304. Using a compiler constructed according to the prior art, it is first determined that parallelization is possible for the first multiple loop and the second multiple loop, and then the respective multiple loops are parallelized. FIG. 3A shows part of the program once the first multiple loop has been parallelized, while FIG. 3B shows part of the program once the second multiple loop has been parallelized. In FIG. 3A, the programs are shown as being executed by PE1–PE8 with regard to i in loop 301. In FIG. 3B, the programs are shown as being executed by PE1–PE8 with regard to j in loop 303.

Figure 4:
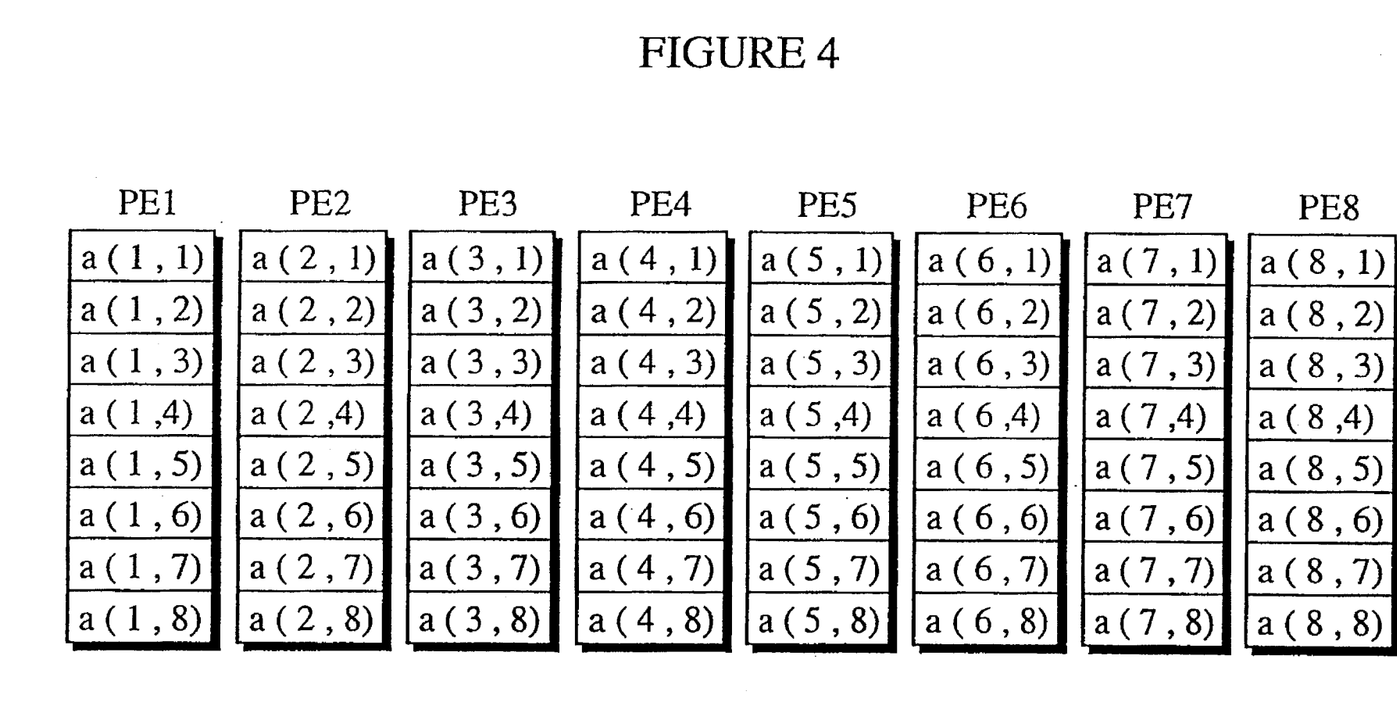
FIG. 4 shows the array a(i,j) stored as being distributed among every PE memory.

In general, for the parallel computer shown in FIG. 1, the transmission between the processor elements of data which is necessary for the calculations is frequently executed. After the program in FIG. 3A has been executed, then the array a(i,j) is stored having been distributed as shown in FIG. 4 in the memory in every PE. After that, in order to execute the program in FIG. 3B, then it is necessary to store the array a(i,j) in the memory of every PE in the way shown in FIG. 5. Consequently, after the program shown in FIG. 3A has been executed, data transmission is executed between all of the PE, and the program shown in FIG. 3B is executed.

Figure 6:
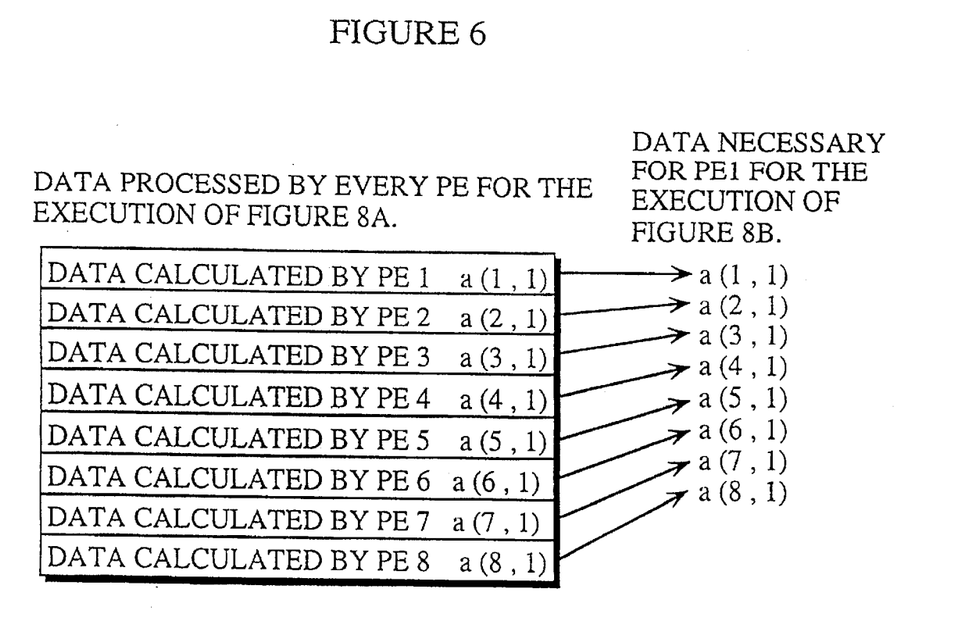
FIG. 6 an example of the array elements transmitted to PE1.

However, according to the above prior art, since the parallelization is executed for every multiple loop separately, there is the problem that during parallelization, the number of data transmissions is not necessarily the lowest possible number. For the above example, only the data transmitted to PE1 from every PE is shown in FIG. 6. Since there are 8 array elements to be transmitted in the same way as with PE1, then from PE1–PE8 there are 64 sets of array elements to be transmitted.

SUMMARY OF THE INVENTION

The object of the present invention is to provide a device and method for optimizing parallel compilation which, when parallelizing program loops, optimizes the number of data transmissions to the lowest possible figure.

The above object can be achieved by an optimizing compiler apparatus for converting a source program into an object program for use by a parallel computer, which optimizes a number of data transmissions between processing elements for a parallel computer made up of a plurality of processing elements, comprising: a loop retrieval unit for retrieving loop processes from a program; a data transmission calculation unit for calculating a data transmission count generated when each of the loop processes is parallelized; a parallelization determination unit for determining a loop to be parallelized as a loop with a lowest data transmission count, out of all of the loops contained in each of the multiple loops; and a code generation unit for generating a parallelized object code for the determined loop.

The data transmission calculation unit may comprise: a right side variable retrieval unit for retrieving a variable on a right side of an equation in each of the loops retrieved by the loop retrieval unit; a variable information storage unit for storing information relating to array variables which should be distributed among every processing element for a part of the program which comes before the loop from which the right side variable retrieval unit has retrieved the right side variable; and a calculation unit for calculating a data transmission count based on the variable information for the retrieved right side variable.

The variable information storage unit may store information which includes an array variable name, dimensions of an array and distribution information which shows with regard to which subscript distribution to every processing element is performed.

The variable information storage unit may store the information relating to an array variable passed over as an argument between a main routine and a subroutine.

The variable information storage unit may include an information retrieval means for retrieving the information relating to a left side variable in the loop, for every loop determined to be parallelized by the parallelization determination unit and an information storage unit for storing the retrieved information.

The calculation unit may calculate a data transmission count for a right side variable when a variable name stored by the information storage unit is the same as the right side variable retrieved by the right side variable retrieval unit.

The calculation unit may calculate as being 0 a data transmission count for the right side variables of the same variable name when, for the variables, a subscript showing distribution direction and a subscript shown by the distribution information coincide, and, when the subscripts do not coincide, calculates the data transmission count based on a number of processing elements and sizes of array dimensions.

The calculation unit may calculate the data transmission count using one of the following equations when the 2 subscripts do not coincide:

i. data transmission count=(number of processing elements)*(sizes of array dimensions)

ii. data transmission count=(number of processing elements)*(sizes of array dimensions−1).

Since parallelization can be achieved by means of this construction with the minimum amount of data transmission, then the overheads caused by data transmission when the program is executed can be minimized. As a result, the executional efficiency of a parallel computer can be improved.

The above object may also be achieved by an optimizing compiler method for converting a source program into an object program for use by a parallel computer, which optimizes a number of data transmissions between processing elements for a parallel computer made up of a plurality of processing elements, comprising the following steps:

an intermediate code generation step for converting a source program into intermediate code;

a loop retrieval step for retrieving loops from the intermediate code;

a variable retrieval step for retrieving array variables on the left side and on the right side of the equation in each of the loops;

a data dependency detection step for detecting whether there is data dependency which extends over iterations of the loop, based on the retrieved left side variable and right side variable;

a left side variable retrieval step for retrieving information relating to array variables on a left side of an equation, being the array variables which should be distributed to every programming element for a program part coming before a loop, for a loop determined to have no data dependency;

a data transmission count calculation step for calculating a number of data transmissions generated when parallelizing the loop, based on the information for each right side variable, for the loop determined to have no data dependency;

a parallelization determination step for determining a loop to be parallelized as a loop with the lowest data transmission count; and a code generation step for generating the object code which parallelizes the determined loop.

Under this construction, the same result as above may be obtained.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Entire Composition

Figure 7:
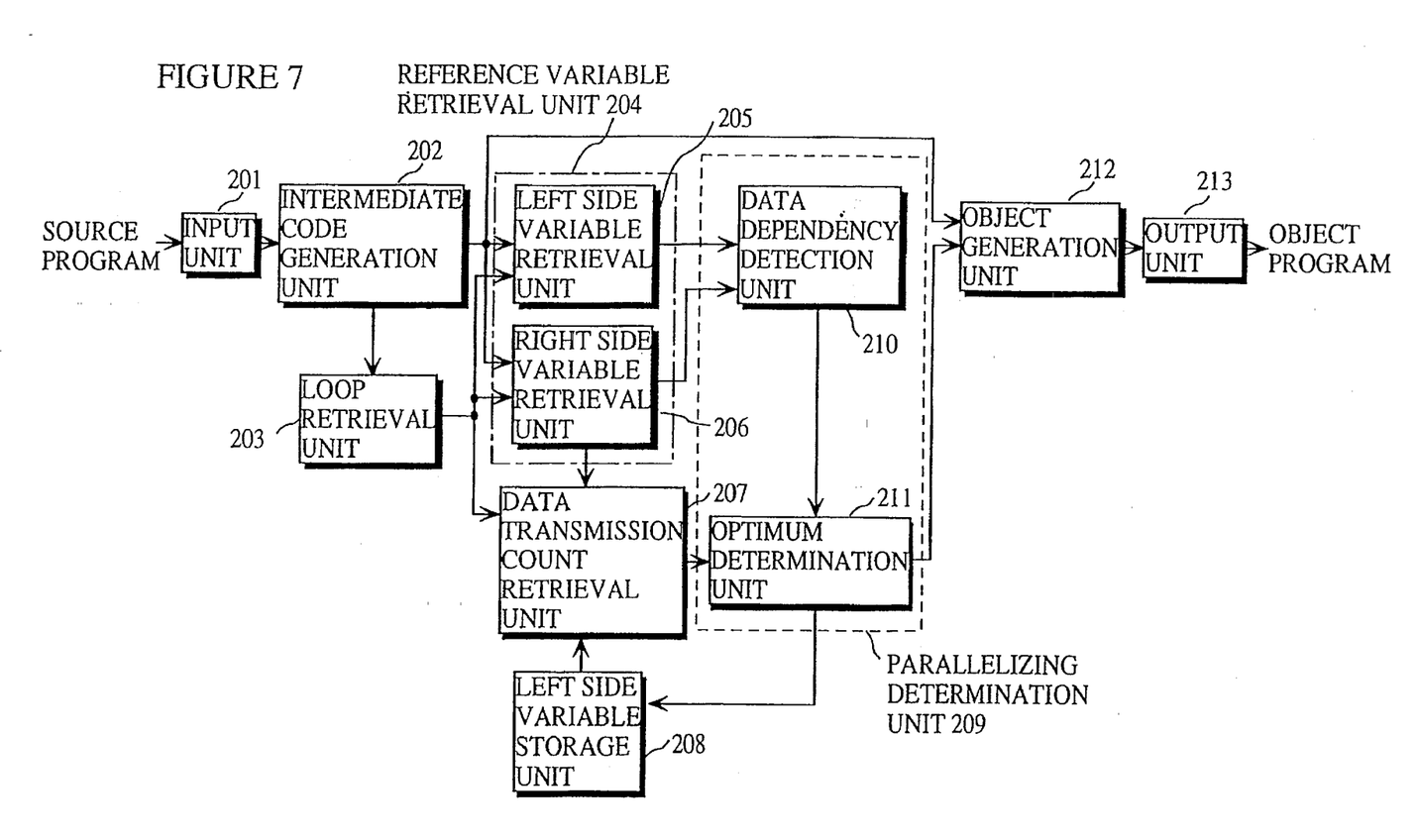
FIG. 7 is a block diagram showing the construction of a program conversion apparatus according to the embodiment of the present invention.

FIG. 7 is a block diagram showing the construction of a program conversion apparatus constructed according to the embodiment of the present invention. As shown in this diagram, this program conversion apparatus is constructed of an input unit 201, an intermediate code generation unit 202, a loop retrieval unit 203, a reference variable retrieval unit 204 (a left side variable retrieval unit 205 and a right side variable retrieval unit 206), a data transmission count retrieval unit 207, a left side variable storage unit 208, a parallelizing determination unit 209 (a data dependency detection unit 210 and a optimum determination unit 211), an object generation unit 212 and an output unit 213.

The input unit 201 receives a source program written in a high-level language, such as FORTRAN, from an external unit.

The intermediate code generation unit 202 converts the source program received by the input unit 201 into a program written in an intermediate code.

The loop retrieval unit 203 retrieves the loop processes included in the intermediate code. More precisely, it distinguishes the pairs of do and continue statements and retrieves them as loops.

The reference variable retrieval unit 204 comprises a left side variable retrieval unit 205 and a right side variable retrieval unit 206 and retrieves the variables in each of the loop processes retrieved by the loop retrieval unit 203.

Figure 8A:
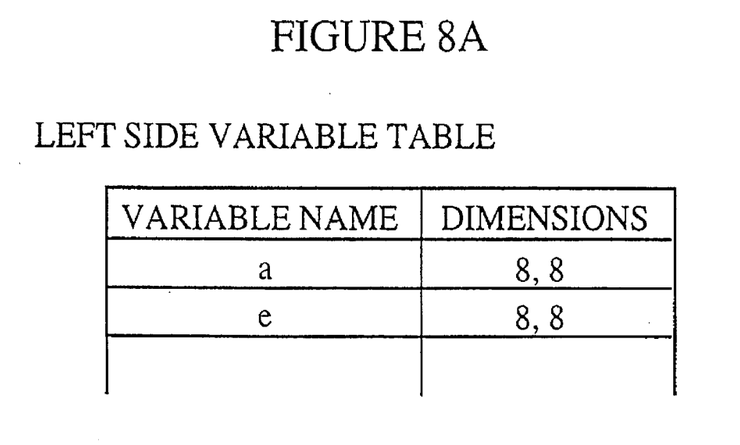
FIG. 8A is a table showing an example of the stored content of the left side variable table.

The left side variable retrieval unit 205 retrieves the variables on the left side of the equation in a retrieved loop process and stores this retrieved result in the internal left side variable table (not shown in the diagram). FIG. 8A is a table showing an example of the stored content of this left side variable table. In this drawing, the retrieved results of the left side variable retrieval unit 205 are shown for the multiple loop composed of loops 301, 302. This left side variable table stores the variable name and the dimensions of the subscripts for when this variable is an array.

Figure 8B:
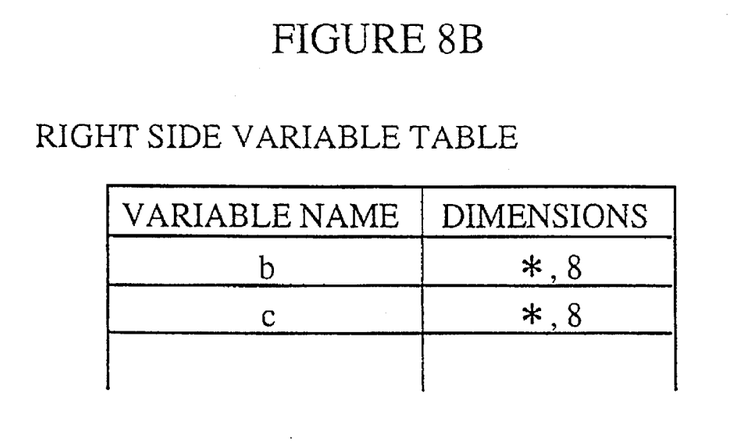
FIG. 8B is a table showing an example of the stored content of the right side variable table.

The right side variable retrieval unit 206 retrieves the variables on the right side of the equation in the same way. In FIG. 8B the retrieved results of the right side variable retrieval unit 206 are shown for the multiple loops composed of loops 301, 302. This right side variable table stores, in the same way as in FIG. 8A, the variable name and the dimensions of the subscripts for when this variable is an array. Additionally, the asterisk * noted in the dimensions shows that the distribution among the memory of every PE is executed with regard to that subscript. In this drawing, the dimensions (*,8) for the variables b, c indicate that the distributing of the array elements between all of the PE memories is executed with regard to each of the first subscripts (i).

The data transmission count retrieval unit 207 calculates the data transmission count generated when the various loops included in a multiple loop are parallelized, on the basis of the retrieved right side variables and the left side variables stored in the left side variable storage unit 208, for each of the multiple loops retrieved by the loop retrieval unit 203.

Figure 8C:
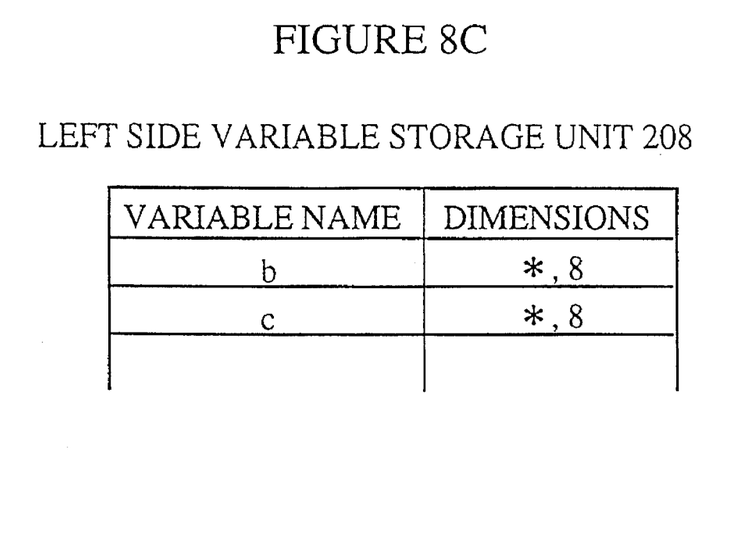
FIG. 8C is a table showing an example of the stored content of the left side variable storage unit 208.

The left side variable storage unit 208 stores the variable name and the dimensions for the variable on the left side of the equation in a loop, once the optimum determination unit 211 has decided that this loop is to be parallelized. In other words, the left side variable storage unit 208 ends up storing the variable name and the dimensions for the left side variable in the loops in the program preceding the loop which is currently the subject of the left side variable retrieval unit 205 and the right side variable retrieval unit 206. This stored content is the variable information which shows the how each variable is distributed among all the processing elements, for the part of the program preceding the loop currently being handled, and is used in the calculation of the data transmission count for multiple loops by the data transmission count retrieval unit 207. Additionally, the left side variable storage unit 208 initializes at the start of the compiling (clearing, or when it is a subroutine program, then it stores the variable name and dimensions for the variables passed over to the memory of every PE as arguments). FIG. 8C is a table showing an example of the stored content of the left side variable storage unit 208. As shown in this drawing, the left side variable storage unit 208 stores the variable name and dimensions in exactly the same way as in FIGS. 8A and 8B. In FIG. 8C, the arrays of the variable names b, c indicate that the distributing and storing between the memory of every PE will be executed in each case with regard to the first subscript.

The parallelizing determination unit 209 is composed of a data dependency detection unit 210 and a optimum determination unit 211, and determines which out of the loops retrieved by the loop retrieval unit 203 are the loops which should be parallelized.

The data dependency detection unit 210 detects whether there are data dependent relations which extend over the loop iteration (data dependency), based on the retrieved results of the left side variable retrieval unit 205 and the right side variable retrieval unit 206.

The optimum determination unit 211 determines that, out of the loops with no data dependency, loops with low data transmission counts should be parallelized, from looking at the determination results of the data reference relations and the data transmission count calculated by the data transmission count retrieval unit 207.

The object generation unit 212 generates the object program for parallel execution when the parallelizing determination unit 209 determines that parallelizing is possible, or an normal object program when it is determined that parallelizing is not possible.

The output unit 213 stores the generated program. This consists, for example, of a disk apparatus or suchlike.

Detailed construction of data transmission count retrieval unit 207

Figure 9:
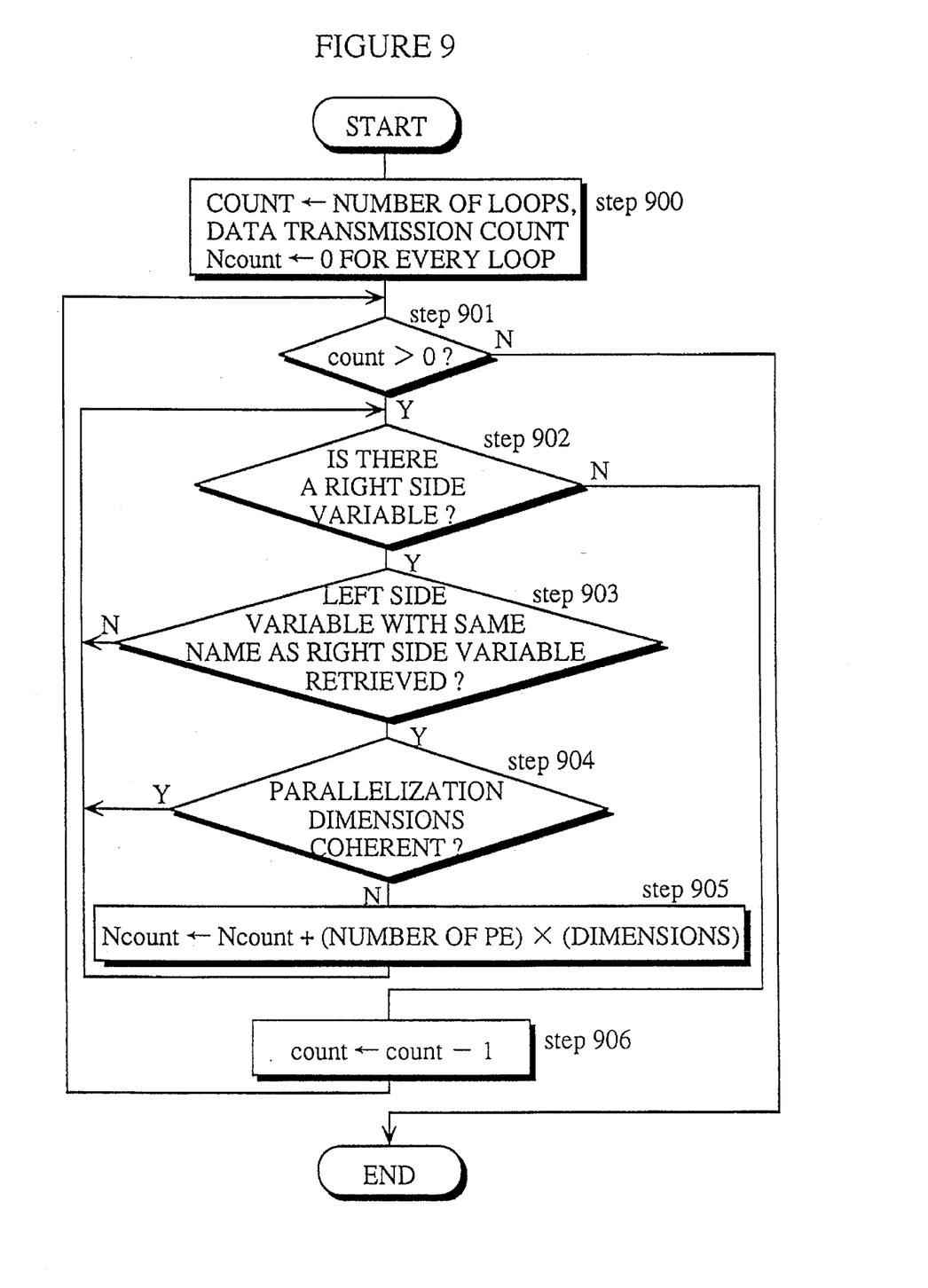
FIG. 9 is a flowchart showing the detailed process of the data transmission count retrieval unit 207.

FIG. 9 is a flowchart showing the detailed process of the data transmission count retrieval unit 207. As shown in this diagram, the data transmission count retrieval unit 207 sets the number of loops included in the multiple loop to be processed as "count", as well as clearing the data transmission count Ncount for every loop (Step 900), from then on executing the process from (Step 901) for one loop at a time. If there are any variables in the right side variable table, then one variable is taken (Step 902:yes), and then a variable with the same name is taken from the left side variable table, if any such variable exists (Step 903:yes). If the two variables which have been taken (left side variable and right side variable) have the same dimensions to be parallelized (subscripts)(Step 904:yes), then since data transmission is not necessary for those variables, it returns to Step 903. If the dimensions to be parallelized are different (Step 904:no), then since data transmission is necessary, then the necessary data transmission count for those variables=(number of PE) * (size of subscript showing the parallelizing direction) is found and is added to the Ncount (Step 905).

Figure 5:
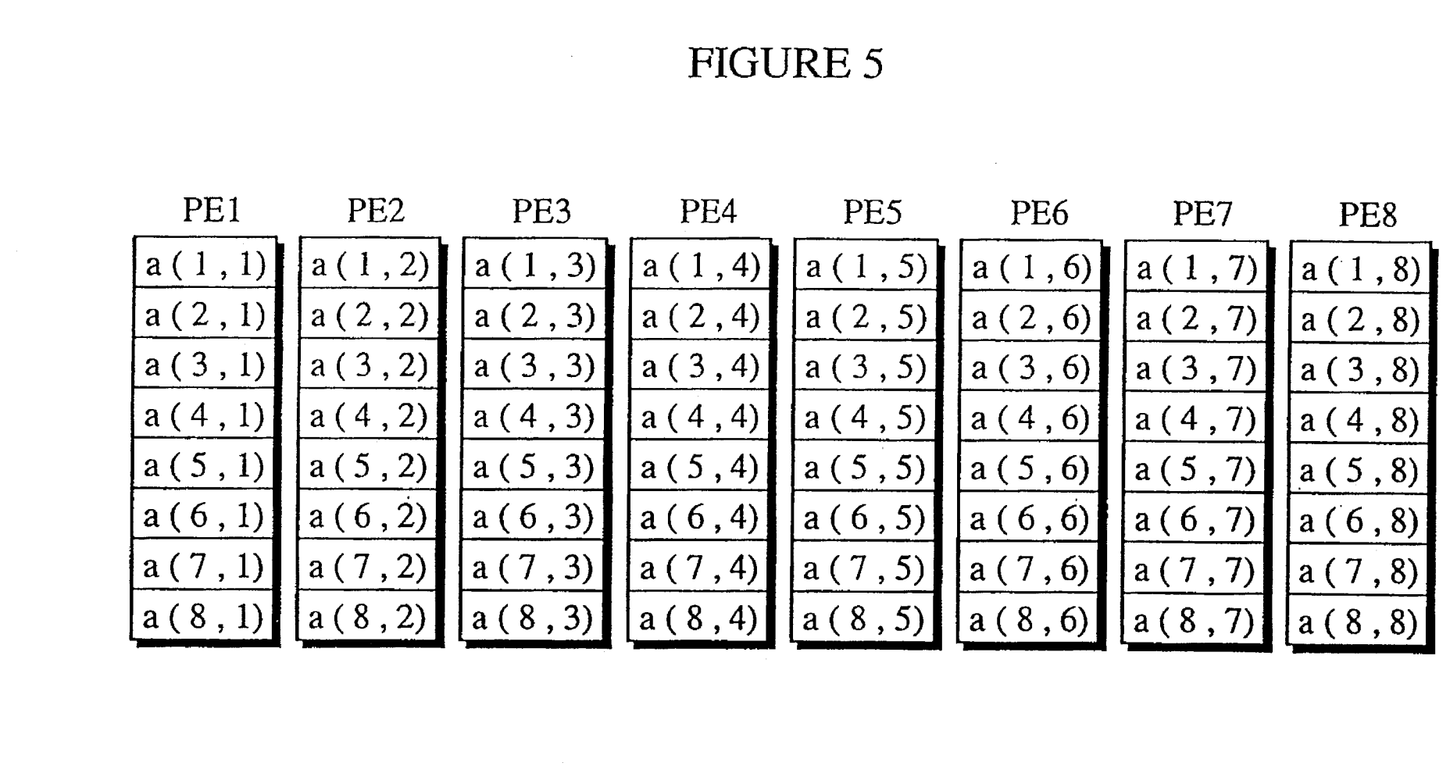
FIG. 5 shows the array a(i,j) stored as being distributed among every PE memory.

For example, using the premise of the parallel computer shown in FIG. 1, when the left side variable is a(*,8) and the right side variable is a(8,*), then for these variables the data transmission count is 8 (PE=8) *8 (size of the subscript showing the parallelizing direction)=64. The following is an explanation as to why this amount of data transmission is necessary. The left side variable a(*,8) indicates that those array elements are distributed among the memory of every PE as shown in FIG. 4. Also, the right side variable a(8,*) indicates that those array elements are distributed among the memory of every PE as shown in FIG. 5. Since the parallel computer cannot execute the calculation unless the right side variable a(8,*) is stored in the memory, then it becomes necessary for the parallel computer to have the array a(*,8) distributed as shown in FIG. 4 redistributed in the way shown in FIG. 5. This redistribution is achieved by transmitting all of the elements of the array between the pairs of PE. In FIG. 6, the case where the array elements are transmitted to PE1 is shown. In this drawing, it can be seen that 8 pieces of data are transmitted to PE1. PE2–PE8 are the same, so that the data transmission count for the parallel computer comes to a total of 64.

Also, when the left side variable is a(*,8) and the right side variable is also a(*,8), then, as shown in FIG. 4, since the parallelization dimensions (subscripts) are coincident, then, since data transmission is not necessary, the data transmission count becomes 0.

The data transmission count retrieval unit 207 repeats the above process for all the right side variables (Step 903) in all of the loops (Steps 906, 902), and finds the data transmission count Ncount for every loop.

Explanation of Operation

Figure 10:
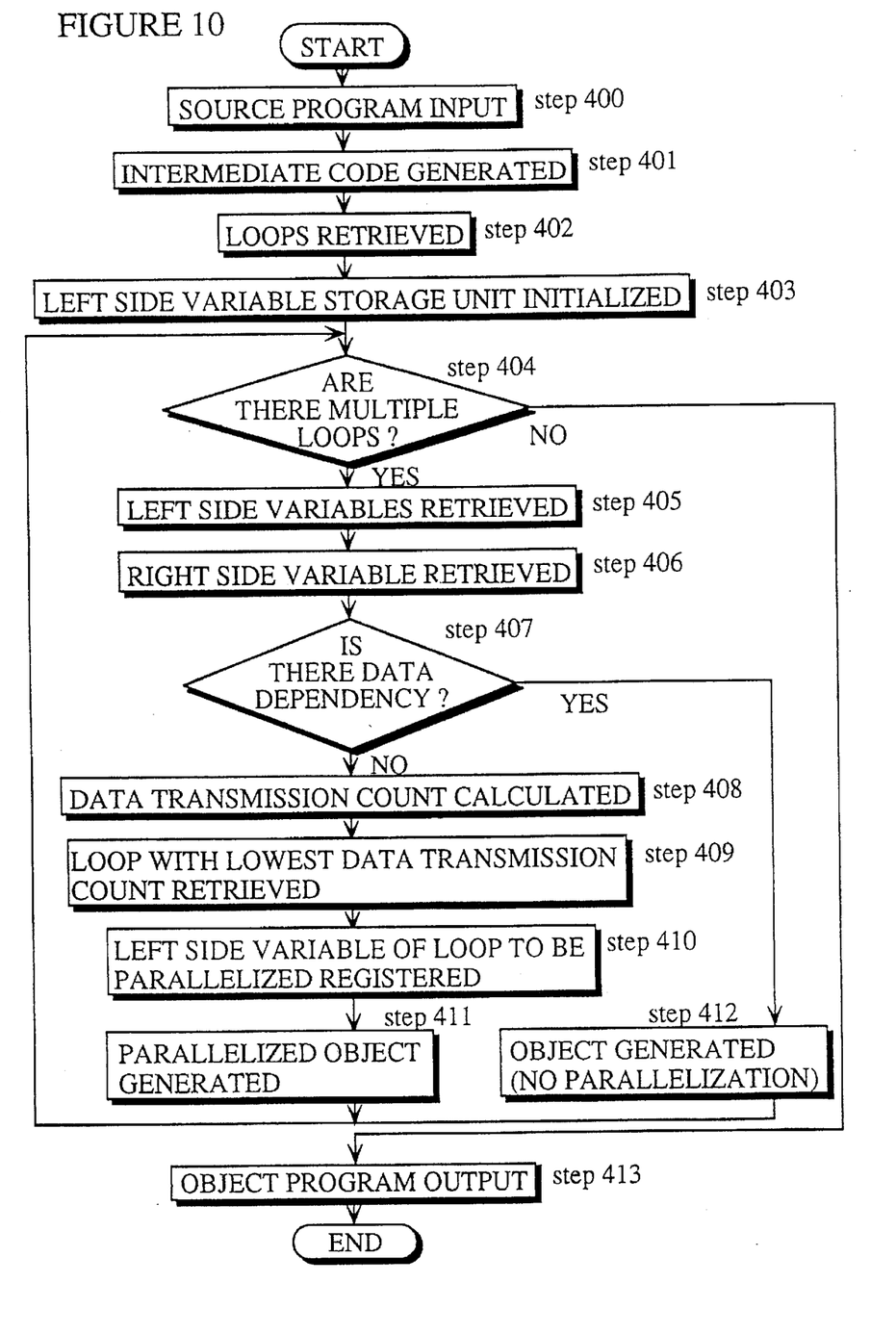
FIG. 10 is a flowchart which shows the operation of a compiler apparatus constructed according to the embodiment of the present invention.

The following is an explanation of the operation of a compiler apparatus constructed in accordance with the embodiment described above of the present invention, with reference to the flowchart shown in FIG. 10.

The source program to be compiled is inputted into the intermediate code generation unit 202 via the input unit 201

(Step 400). In this embodiment, the example program shown in FIG. 2 will again be used. The source program is then converted into intermediate code by the intermediate code generation unit 202 (Step 401). The loop retrieval unit 203 then distinguishes the pairs of do and continue statements contained in this intermediate code program, and retrieves them as loops. For the example program shown in FIG. 2, the 2 multiple loops consisting of loop 302 (do 10 loop with regard to variable j) inside loop 301 (do 10 external loop with regard to variable j) and loop 304 (do 20 loop with regard to variable j) inside loop 303 (do 20 external loop with regard to variable i) are retrieved (Step 402).

Next, the left side variable storage unit 208 is initialized (Step 403). For the sake of convenience, under the present embodiment, it is supposed that the variables b(i,j) and c(i,j) are provided as arguments. Also, it is supposed the initialized left side variable storage unit 208 stores the variables b, c and their respective dimensions (*,8), (8,*) having received these arguments as shown in FIG. 8C. On this occasion, the variables are distributed among every PE and stored with regard to the first subscript i.

The First Multiple Loop

The left side variable retrieval unit 205 retrieves the left side variable (Step 405) and the right side variable retrieval unit 206 retrieves the right side variable (Step 406) for the first multiple loop retrieved by the loop retrieval unit 203 (Step 404:yes). For the example program in FIG. 2, the array a(i,j) on the left side and the arrays b(i,j) and c(i,j) on the right side of the equation in the first multiple loop (loops 301, 302) are retrieved. The left variable and right variable shown in FIGS. 8A and 8B show the retrieved result at this point. In FIG. 8B, the first subscript part is shown as *, reflecting that the arrays b, c are distributed to every PE with regard to this first subscript.

Based on this retrieved result, the data dependency detection unit 210 determines whether there is any data dependency which extends over the loop iterations. Since the left side variable a(i,j) which is the calculated result for the loop 301 is not used on the right side, then it determines that there is no data dependency (Step 407:no).

Next, the data transmission count determination unit 207 calculates the data transmission count (Step 408) for when loops 301 and 302 are parallelized, basing this calculation on the left side variable stored in the left side variable storage unit 208 and the variable retrieved by the right side variable retrieval unit 206.

The following is an detailed explanation of the data transmission calculation with reference to the flowchart in FIG. 9. Firstly, the data transmission count determination unit 207 sets the count=2 and Ncount (N1 and N2)=0, for the first multiple loop to be calculated (Step 900), and, out of the loops 301 and 302, takes the loop 301 (Step 901). At this point, the right side variable table is storing the variables b, c and their respective dimensions (*,8), (*,8), while the left side variable storage unit 208 is storing the variables b, c and their respective dimensions (*,8), (*,8). Therefore, the data transmission count determination unit 207 sets N2=0, since for both variable b and variable c, there is coherence for the dimensions when loop 301 is parallelized (Step 902:yes, 903:yes, 904:yes).

Next, since for variable b and variable c, there is no coherence for the parallelizing dimensions when the other loop (Step 902:no, 906), loop 302, is parallelized (Step 902:yes, 903:yes, 904:no), the data transmission count determination unit 207 sets N1=64+64=128.

Figure 11A:
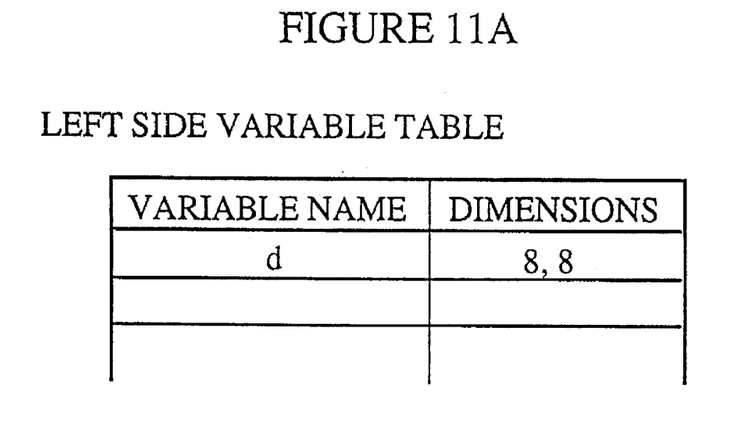
FIG. 11A is a table showing an example of the stored content of the left side variable table.
Figure 11B:
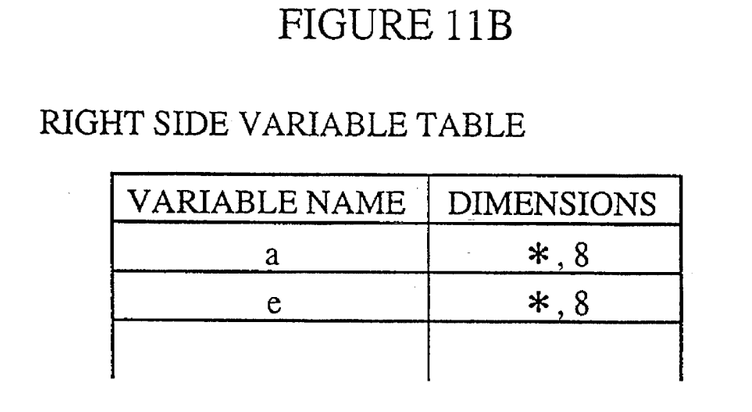
FIG. 11B is a table showing an example of the stored content of the right side variable table.
Figure 11C:
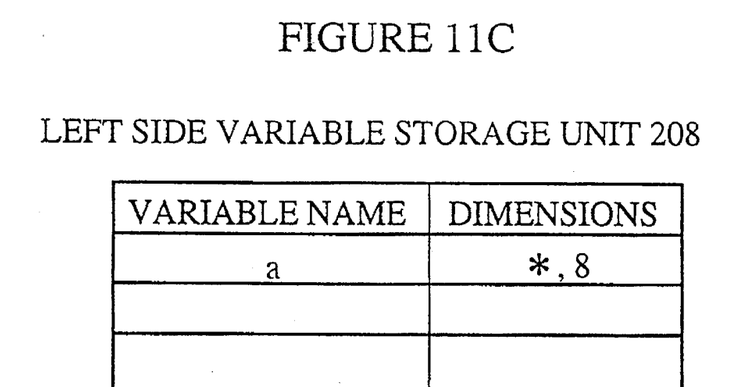
FIG. 11C is a table showing an example of the stored content of the left side variable storage unit 208.

The optimum determination unit 211 looks at these calculated results and decides that the loop 301, whereby the data transmission count is 0, is to be parallelized (Step 409), and furthermore, stores the left side variable in the equation in that loop, variable a(i,j) in the left side variable storage unit 208 (Step 410). As a result, the stored content of the left side variable storage unit 208 becomes the variable name a and its dimensions (*,8), as shown in FIG. 11C.

Additionally, the object generation unit 212 generates the object code for the chosen loop to be parallelized 301 (Step 411). The generated object code is then output by the output unit 213 (Step 413).

The Second Multiple Loop

Next, the left side variable and the right side variable are retrieved for the second multiple loop (Step 404:yes) by the left side variable retrieval unit 205 and the right side variable retrieval unit 206 (Steps 405,406), and are stored respectively in the left side variable table and the right side variable table. As a result, the stored contents of the left side variable table and the right side variable table become as shown in FIGS. 11A, 11B. Based on the stored contents of these tables, the data dependency detection unit 210 then determines that there is no data dependency (Step 407).

Following this, the data transmission count determination unit 207 calculates the data transmission count for each of the loops 303, 304 in the second multiple loop by executing the procedure shown in the flowchart in FIG. 9. Since this data transmission count is calculated in the same way as for the first multiple loop, it will not be explained. For the second multiple loop, the data transmission counts N1, N2 when parallelizing the loops 303, 304 become 64, and 0, respectively.

The optimum determination unit 211 decides that the loop with the lowest data transmission count, that is to say, loop 304 (N2), is the loop to be parallelized. Subsequently, the object code whereby loop 304 is parallelized is generated by the object code generation unit 212, and is then outputted by the output unit 213.

In this embodiment, data transmission count has been found as (number of PE) * (size of the subscript showing the parallelizing direction). This calculation includes data transmission from PE1 to PE1, such as for a(1,1) in FIG. 6. By using a data transmission method for the parallel computer shown in FIG. 1 which considers such transmissions as unnecessary, then the data transmission count may be found as (number of PE) * ((size of the subscript showing the parallelizing direction)−1).

Also, in the above embodiment, a example using a source program written in FORTRAN is given, but it is possible for the source program to be written in a different high-level language.

In the manner described above, by using the present invention, a parallelizing compiler, then for the example program given in FIG. 2, by parallelizing the loops 301, 304 out of the first and second multiple loops, then it becomes unnecessary to transmit data before executing the first multiple loop and the second multiple loop, resulting in a great improvement in the execution speed of the program.

In comparison, under the prior art no special distinction is made between external loops and internal loops included in multiple loops, so that for the example program in FIG. 2, it is likely that loops 301 and 303 would be chosen as the loops to be parallelized. In such a case, then the data transmission of 64 array elements is necessary before the execution of multiple loop 2. Additionally, if loops 302, 304 are chosen to be parallelized, then 128 data transmissions become necessary before the execution of the first multiple loop, and 64 before the second, making a total of 192 data transmissions. Since under the embodiment of the present invention loops with the lowest data transmission count are chosen to be parallelized, the execution speed of a program can be improved.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being include therein.

What is claimed is:

1. An optimizing compiler apparatus for converting a source program into an object program for use by a parallel computer, which optimizes a number of data transmissions between processing elements for a parallel computer made up of a plurality of processing elements, comprising:

intermediate code generation means for converting a source program into intermediate code;

loop retrieval means for retrieving loops from the intermediate code;

variable retrieval means for retrieving array variables on the left side and on the right side of the equation in each of the loops;

data dependency detection means for detecting whether there is data dependency which extends over iterations of the loop, based on the retrieved left side variable and right side variable;

left side variable storage means for storing information relating to array variables on a left side of an equation, being the array variables which should be distributed to every programming element for a program part coming before a loop, for a loop determined to have no data dependency;

data transmission count calculation means for calculating a data transmissions count generated when parallelizing the loop, based on the information for each right side variable, for the loop determined to have no data dependency;

parallelization determination means for determining a loop to be parallelized as a loop with the lowest data transmission count; and code generation means for generating the object code which parallelizes the determined loop.

2. The optimizing compiler apparatus of claim 1, wherein the left side variable information storage means stores information which includes an array variable name, dimensions of an array and distribution information which shows with regard to which subscript distribution to every processing element is performed.

3. The optimizing compiler apparatus of claim 2, wherein the left side variable information storage means stores the information relating to an array variable passed over as an argument between a main routine and a subroutine.

4. The optimizing compiler apparatus of claim 2, wherein the left side variable information storage means includes:

information retrieval means for retrieving the information relating to a left side variable in the loop, for every loop determined to be parallelized by the parallelization determination means; and information storage means for storing the retrieved information.

5. The optimizing compiler apparatus of claim 4, wherein the calculation means calculates a data transmission count for a right side variable when a variable name stored by the information storage means is the same as the right side variable retrieved by the right side variable retrieval means.

6. The optimizing compiler apparatus of claim 5, wherein the calculation means calculates as being 0 a data transmission count for the right side variables of the same variable name, when, for the variables, a subscript showing distribution direction and a subscript shown by distribution information coincide, and, when the subscripts do not coincide, calculates the data transmission count based on the number of processing elements and array dimensions (size of subscripts).

7. The optimizing compiler apparatus of claim 6, wherein the calculation means calculates the data transmission count using one of the following equations when the 2 subscripts do not coincide:

i. data transmission count=(number of processing elements)*(sizes of array dimensions)

ii. data transmission count=(number of processing elements)*

(sizes of array dimensions −1).

8. An optimizing compiler method for converting a source program into an object program for use by a parallel computer, which optimizes a number of data transmissions between processing elements for a parallel computer made up of a plurality of processing elements, comprising the following steps:

an intermediate code generation step for converting a source program into intermediate code;

a loop retrieval step for retrieving loops from the intermediate code;

a variable retrieval step for retrieving array variables on the left side and on the right side of the equation in each of the loops;

a data dependency detection step for detecting whether there is data dependency which extends over iterations of the loop, based on the retrieved left side variable and right side variable;

a left side variable retrieval step for retrieving information relating to array variables on a left side of an equation, being the array variables which should be distributed to every programming element for a program part coming before a loop, for a loop determined to have no data dependency;

a data transmission count calculation step for calculating a number of data transmissions generated when parallelizing the loop, based on the information for each right side variable, for the loop determined to have no data dependency;

a parallelization determination step for determining a loop to be parallelized as a loop with the lowest data transmission count; and a code generation step for generating the object code which parallelizes the determined loop.

9. The optimizing compiler method of claim 8, wherein the left side variable information retrieval step retrieves information which includes an array variable name, dimensions of an array and distribution information which shows with regard to which subscript distribution to every processing element is performed.

10. The optimizing compiler method of claim 9, wherein the left side variable retrieval step retrieves the information relating to an array variable passed over as an argument between a main routine and a subroutine.

11. The optimizing compiler method of claim 9 wherein the left side variable information storage step includes:

an information retrieval step for retrieving the information relating to a left side variable in the loop, for every loop determined to be parallelized by the parallelization determination step; and an information storage step for storing the retrieved information in a table.

12. The optimizing compiler method of claim 11, wherein the calculation step calculates a data transmission count for a right side variable when a variable name stored in the table by the information storage step is the same as the right side variable retrieved by the right side variable retrieval step.

13. The optimizing compiler method of claim 12, wherein the calculation step calculates as being 0 a data transmission count for the right side variables of the same variable name when, for the variables, a subscript showing distribution direction and a subscript shown by distribution information coincide, and, when the subscripts do not coincide, calculates the data transmission count based on the number of processing elements and array dimensions (size of subscripts).

14. The optimizing compiler apparatus of claim 13, wherein the calculation step calculates the data transmission count using one of the following equations when the 2 subscripts do not coincide:
  i. data transmission count=(number of processing elements)*(sizes of array dimensions)
  ii. data transmission count=(number of processing elements)* (sizes of array dimensions−1).

15. An optimizing compiler apparatus for converting a source program into an object program for use by a parallel computer, which optimizes a number of data transmissions between processing elements for a parallel computer made up of a plurality of processing elements, comprising:

loop retrieval means for retrieving loop processes from a program;

data transmission calculation means for calculating a data transmission count generated when each of the loop processes is parallelized including:

right side variable retrieval means for retrieving a variable on a right side of an equation in each of the loops retrieved by the loop retrieval means;

variable information storage means for storing information relating to array variables which should be distributed among every processing element for a part of the program which comes before the loop from which the right side variable retrieval means has retrieved the right side variable, including information retrieval means for retrieving the information relating to a left side variable in the loop, for every loop determined to be parallelized by the parallelization determination means, and information storage means for storing the retrieved information, wherein the variable information storage means stores information which includes an array variable name, dimensions of an array, and distribution information which shows with regard to which subscript distribution to every processing element is performed; and calculation means for calculating a data transmission count based on the variable information for the retrieved right side variable when a variable name stored by the information storage means is the same as the right side variable retrieved by the right side variable retrieval means;

parallelization determination means for determining a loop to be parallelized as a loop with a lowest data transmission count, out of all of the loops contained in each of the multiple loops; and code generation means for generating a parallelized object code for the determined loop.

16. The optimizing compiler apparatus of claim 15, wherein the calculation means calculates as being 0 a data transmission count for the right side variables of the same variable name when, for the variables, a subscript showing distribution direction and a subscript shown by the distribution information coincide, and, when the subscripts do not coincide, calculates the data transmission count based on a number of processing elements and sizes of array dimensions.

17. The optimizing compiler apparatus of claim 16, wherein the calculation means calculates the data transmission count using one of the following equations when the 2 subscripts do not coincide:
  i. data transmission count=(number of processing elements)*(sizes of array dimensions)
  ii. data transmission count=(number of processing elements)* (sizes of array dimensions−1).

18. The optimizing compiler apparatus of claim 17, wherein the calculation means calculates the data transmission count using one of the following equations when the 2 subscripts do not coincide:
  i. data transmission count=(number of processing elements)*(sizes of array dimensions)
  ii. data transmission count=(number of processing elements)* (sizes of array dimensions)−1).

19. An optimizing compiler apparatus for converting a source program into an object program for use by a parallel computer, which optimizes a number of data transmissions between processing elements for a parallel computer made up of a plurality of processing elements, comprising:

multiple loop retrieval means for retrieving multiple loops of two or more overlapping loop processes in a program;

data transmission count calculation means for calculating a data transmission count created when parallelizing a loop process for each of the loop processes contained in each of the retrieved multiple loops including:

right side variable retrieval means for retrieving a variable on a right side of an equation in each of the multiple loops;

variable information storage means for storing information relating to array variables which should be distributed among every processing element for a part of the program which comes before the multiple loop from which the right side variable retrieval means has retrieved the right side variable, including information retrieval means for retrieving the information relating to a left side variable in the loop, for every loop determined to be parallelized by the parallelization determination means, and information storage means for storing the retrieved information, wherein the variable information storage means stores information which includes an array variable name, dimensions of an array, and distribution information which shows with regard to which subscript distribution to every processing element is performed; and calculation means for calculating a data transmission count based on the variable information for the retrieved right side variable when a viable name stored by the information storage means is the same as the right side variable retrieved by the right side variable retrieval means;

parallelization determination means for determining a loop to be parallelized having a lowest data transmission count out of the loops in each multiple loop; and code generation means for generating object code parallelizing the determined loop.

20. The optimizing compiler apparatus of claim 19, wherein the calculation means calculates as being 0 a data transmission count for the right side variables of the same variable name when, for the variables, a subscript showing distribution direction and a subscript shown by the distribution information coincide, and, when the subscripts do not coincide, calculates the data transmission count based on the number of processing elements and sizes of array dimensions.

* * * * *